Nov. 10, 1931.  D. L. SWEARINGEN  1,831,429
VENDING MACHINE
Filed March 18, 1931    3 Sheets-Sheet 3
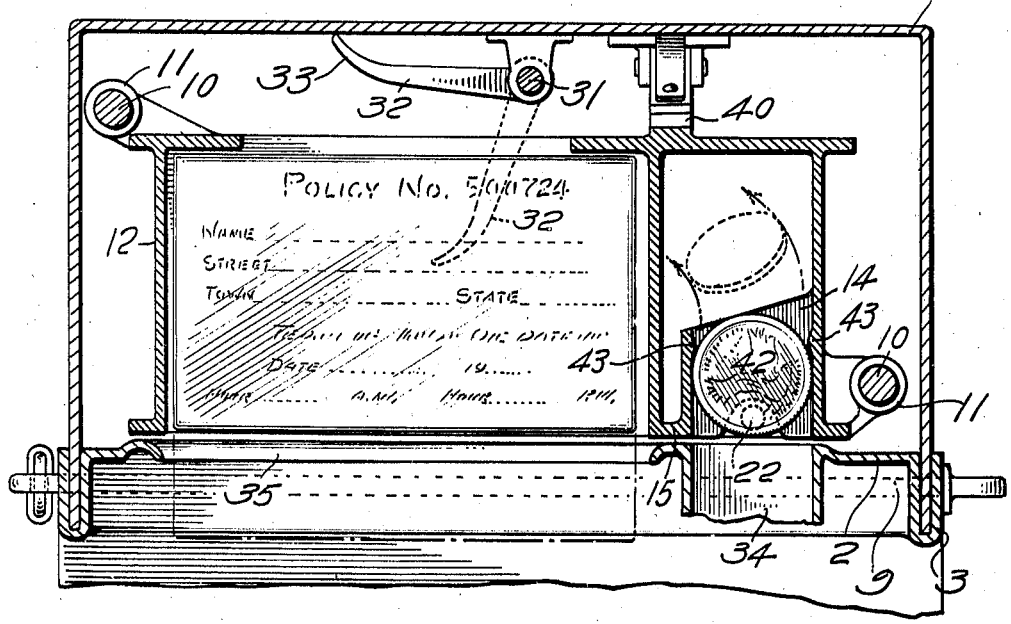
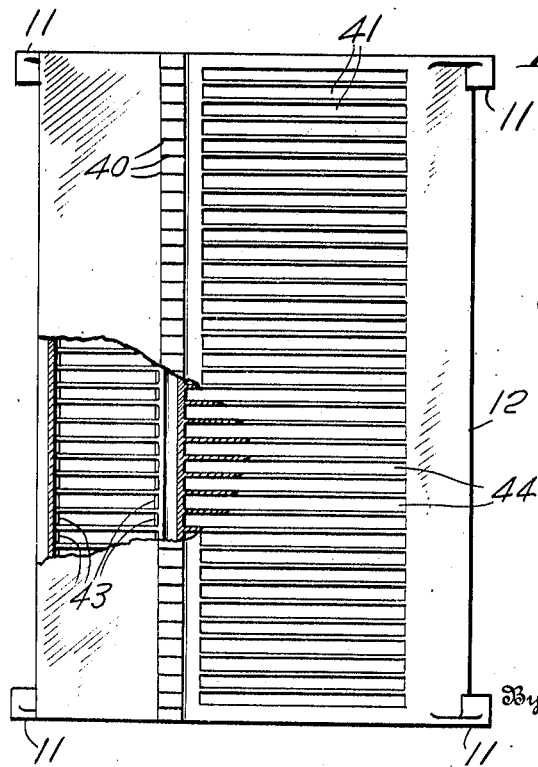

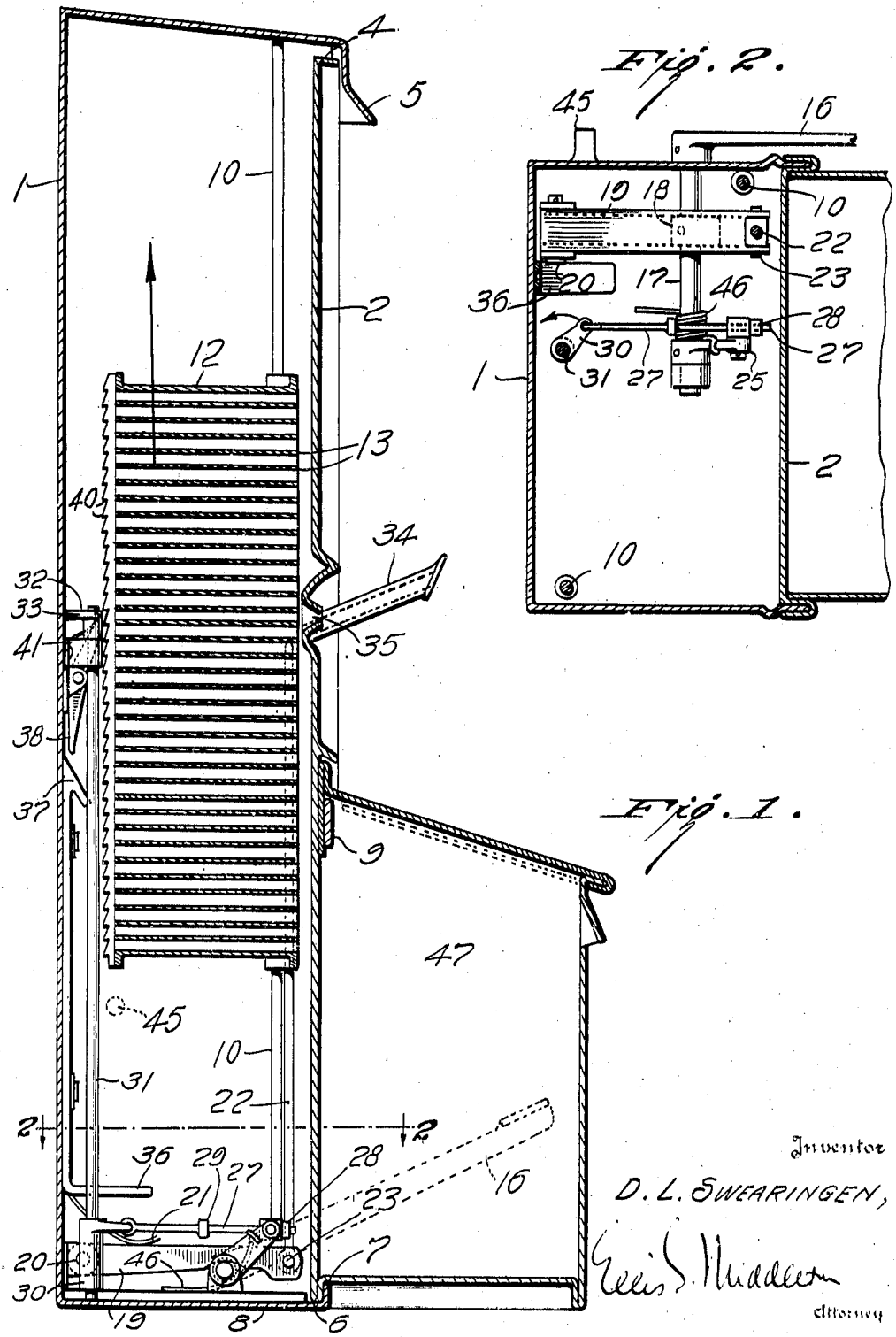

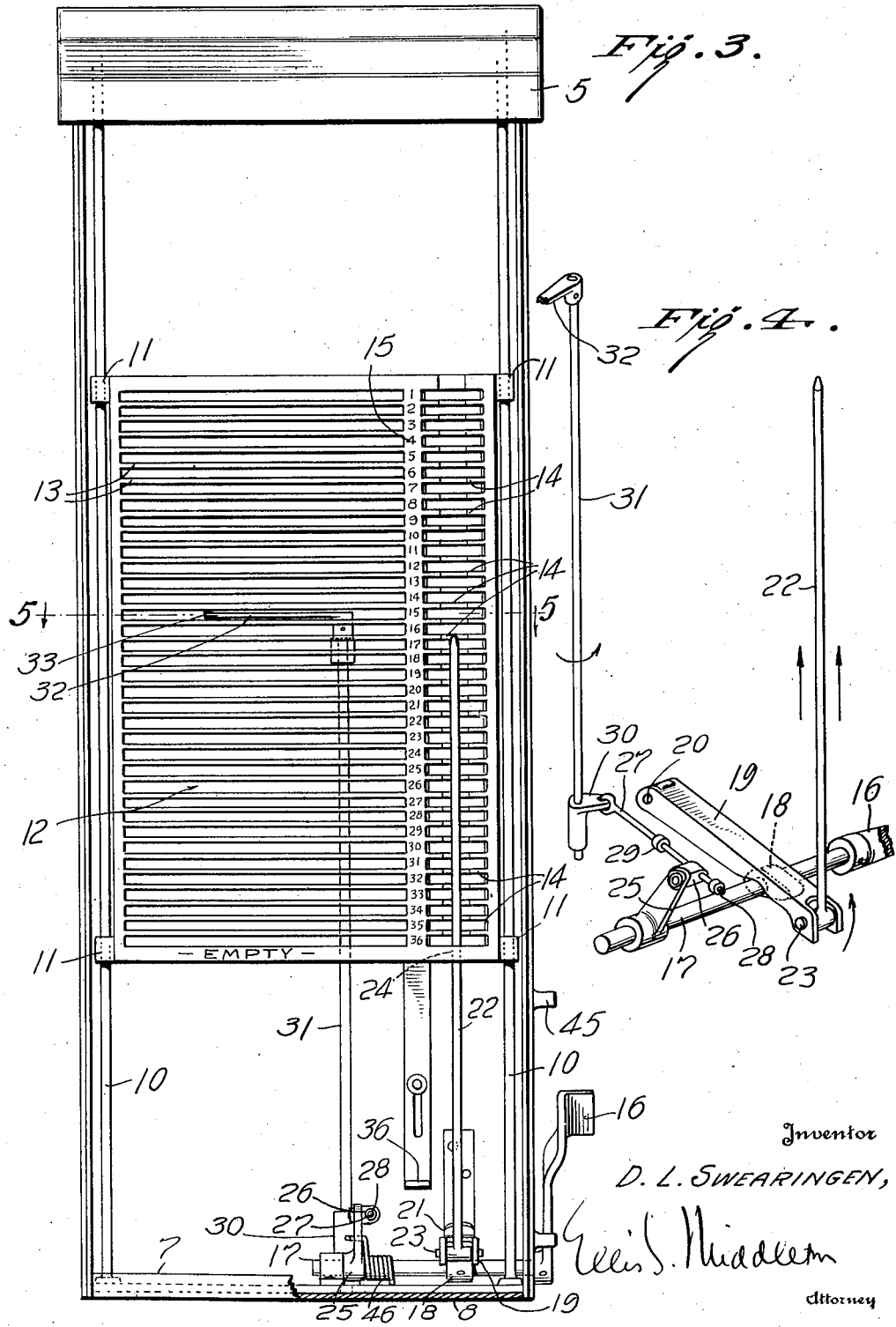

Patented Nov. 10, 1931

1,831,429

UNITED STATES PATENT OFFICE

DONALD L. SWEARINGEN, OF PARKERSBURG, WEST VIRGINIA, ASSIGNOR OF ONE-SIXTH TO GEORGE V. McFADDEN, OF WHEELING, WEST VIRGINIA

VENDING MACHINE

Application filed March 18, 1931. Serial No. 523,402.

The present invention relates to vending machines of the coin controlled type and is particularly concerned with mechanism for dispensing merchandise such as insurance policies, printed booklets, folders or the like.

It is one of the primary objects of the invention to provide a machine of the above type which may be placed at airports, garages, gas stations, railroad stations or other appropriate locations, and which may be operated by the individual desiring to purchase the commodity without requiring the attention of a salesman or attendant.

A particular embodiment of the invention involves the vending of insurance policies of the type which aim to insure an individual against accident or loss of life for a limited period such as a day or a few hours. Such policies are usually issued to persons about to make short trips such as on a railroad or a flight in an airplane or the like. It is customary in such policies that the protection may be had by anyone, without examination physical or otherwise and the issuance of the policy involves simply recording the purchaser's signature, address and time of issuance of the policy and the payment of the premium to make the same effective. Certain safeguards must be thrown about the issuance of such a policy by automatic equipment however, and hence the invention contemplates a certain mechanical combination of parts whereby the insurance company or its agent may readily determine upon periodical inspection of the machine, which policy or policies were regularly issued and which were not, such for instance as where a purchaser inserted a slug instead of the proper coin. Having determined this fact, the company can then cancel the policy or take other appropriate action. This serves not only as a safeguard to the company, but protects the agent as well.

In one of its aspects, the invention contemplates the provision of a casing in which is located a magazine adapted to receive both the articles to be vended and the coin in payment therefor in separate compartments, the magazine having a series of shelves carrying the individual articles to be dispensed, there being a section of the shelf or a corresponding shelf reserved for the payment coin. Each coin remains on its shelf until the machine is emptied. As there are corresponding shelves for the article vended and the coin, it may be readily determined which coin was offered in payment for any particular article. As a result, if insurance policies are being vended, a particular policy may be cancelled if it is found that its corresponding coin proves to be a slug.

The magazine is positioned within the casing in a vertically movable manner so that an operating lever on the outside of the casing may cause the magazine to be raised in a step by step manner, as coins are inserted, the raising of the magazine bringing consecutive article shelves in line with an ejection opening in the housing through which the individual articles are ejected to the purchaser.

Means are provided as a coin, for making the necessary operative connection between the operating lever and the magazine to raise the latter, and such mechanism may consist of a vertically movable rod operated by the lever which can only transmit a vertical movement to the magazine by engagement with the proper size coin resting properly on its shelf. If the coin is the correct one, the rod engages it, and under action of the operating lever, the magazine may be raised until the shelf containing the article corresponding to that on which the coin rests, is brought opposite the ejection opening in the casing. Further movement of the operating lever ejects the article. This action may be continued until the magazine is empty.

The invention further consists in the novel arrangements, combinations and construction hereafter described and shown in the drawings, in which Fig. 1 is a sectional elevation of a machine embodying my invention.

Fig. 2 is a sectional view along the line 2—2 of Fig. 1.

Fig. 3 is a front view of the machine of Fig. 1 with the front cover removed.

Fig. 4 is a perspective view showing the operating mechanism.

Fig. 5 is a sectional view along the line 5—5 of Fig. 3.

Fig. 6 is a rear view of the magazine.

Fig. 7 is a detail of the ejection mechanism.

Referring now to the embodiment illustrated, there is shown at 1 a sheet metal casing having a removable front 2 secured thereto as by overlapping side walls 3, the top 4 of the front covering being first inserted beneath a flange 5 of the casing and the bottom 6 of the cover dropped back of an upturned flange 7 of the casing bottom 8. A slide 9 may then be inserted through the overlapped side walls of the casing 1 and cover 2 (Fig. 5) and suitably secured thereto so as to prevent removal of the cover by an unauthorized person.

Within the casing and at each side thereof there are secured vertical guide rods 10 which pass through perforated ears 11 on the side of a magazine 12 adapted to move vertically up or down on the rods as will be more fully described hereinafter.

The magazine proper consists of a series of superimposed shelves 13 forming therebetween individual compartments adapted to receive the individual pieces of merchandise to be distributed. In the preferred form, this may consist of an insurance policy.

A series of short coin shelves 14, which may be extensions of the article shelves 13 are provided at one side of the magazine, corresponding in number to the article shelves so that it may be readily determined which coin was deposited for any article vended. One such arrangement is shown in Fig. 3 where the coin shelves correspond in exact horizontal location with the article shelves. In order to further assist the identification of both coins and policies or other articles, the dividing wall 15 may bear numbers or designations to indicate the position of either or both (Fig. 3).

The operating mechanism is shown in Figs. 3 and 4 to consist of an operating lever 16 located outside and to one side of the casing 1, mounted on a shaft 17 carried in suitable bearings. To this shaft is secured cam 18 which bears against the underside of a lever 19 pivoted to the casing as at 20, a spring 21 bearing against the top thereof and tending to keep the lever in its inoperative or down position. At the end of the lever 19 opposite its pivot is hinged a vertical rod 22 as at 23, the rod extending upwardly through a guide eye 24 at the bottom of the magazine 12 and lying directly in front of the coin shelves 14 in a cut away portion at the front thereof (Fig. 5). The top of the rod 22 is, in normal inoperative position, just below the coin shelf next to be occupied by a coin. (Fig. 3) all for a purpose to be more fully described hereinafter.

The operating shaft 17 (Fig. 4) also has secured thereto an arm 25 carrying at the end thereof a perforated swivel 26 through which passes a rod 27. Stops 28 and 29 on the rod determine at what point movement of the arm 25 may be transmitted to the rod. The rod 27 is pivoted to a lever 30 at the rear thereof, the lever being in turn secured to a vertical ejection shaft 31 carrying at the top thereof the ejection arm 32. The end of the arm 32 is preferably grooved as at 33 (Fig. 7) to more efficiently engage and eject an article from the magazine.

When the cover 2 is in place on the casing, an inclined coin tube 34 projects therefrom and is so located that a coin placed therein slides downwardly onto the coin shelf 14 which at that time is opposite the end of the tube 34. The delivery of the policy or other article is made through opening 35 in the front cover 2.

In order to set the machine ready for operation, the magazine is filled with articles to be vended, which may be insurance policies of any approved form, numbered as desired or identified in any way. A manually operable slide 36 secured inside and to the back of the casing 1 is moved upwardly which causes its wedge shaped end 37 to ride under the lower end of dog 38, thus causing it to move about its pivot and releasing its opposite end 39 from the teeth of rack 40 secured to the back of the magazine. This permits the magazine to be lowered. At the extreme end of this lowering movement, the magazine bottom engages the slide 36 and moves it downwardly thus removing its head 37 from beneath the end of the dog, permitting the latter to engage the rack 40 under action of the spring 41. The front cover 2 is now replaced and locked to the casing and the machine is ready for operation.

In operation, a coin is deposited in the tube 34 and slides downwardly onto the uppermost coin shelf 14. Assuming a 25¢ piece to be the price for which a policy will be issued, this coin will rest as shown at 42 and against shoulders 43. It is to be noted that if a coin smaller than a quarter is deposited in the coin tube, its impetus will carry it between the shoulders 43 and off the rear end of the shelf into a receptacle positioned below the same. Thus not only is the coin lost to the depositor, but it fails to remain in position to make the mechanism operative.

A proper coin being in position, the operating lever 16 is moved toward the rear of the machine. This causes rotation of operating shaft 17 and the arm 19 is cammed upwardly, carrying with it rod 22. The top of the rod engages the under side of the coin, the latter being forced against the top of the compartment within which it lies. Further upward movement of the rod 22 under action of the lever 16 causes the whole magazine to move upwardly and this movement continues until the top 39 of the dog snaps beneath a tooth of the rack 40 on the back of the magazine. As each policy compartment or shelf has a corresponding tooth, raising the magazine one tooth brings a policy compartment opposite the delivery slot 35. Up to this time the arm 25 has been moving along the rod 27 without moving the latter. At this point the swivel 26 engages the stop 29 and continued movement causes rotation of the ejection shaft 31. Thus the ejection arm 32 swings through an opening 44 at the rear of a policy compartment and ejects the same through the front opening 35 in the cover. A stop 45 prevents the operating lever 16 from being moved backwardly too far. Release of the lever 16 causes retraction of all the parts under action of the coil spring 46, and the cam spring 21. The magazine, however, remains where it is, as the dog engages a tooth in the rack ready for another upward step to expose and eject another policy.

It is to be noted that the rod 22 engages the coin 42 near the front thereof, so that if a smaller coin than a quarter is placed in the coin tube, it will under the impetus of its downward slide pass either completely off the coin shelf, or at least toward the two shoulders at the rear of the shelf. In either event, the cut away front portion of the shelf will be unobstructed and permit the rod 22 to move freely therein without operating the machine.

The operator, having secured his policy, may under instructions printed thereon, place his name, address, the date, or any other required data on a fly leaf thereof tear the same off and deposit it in a compartment 47 carried by the front cover, to be later collected for the insurance company. This operation may be continued as desired, all without attention, the magazine riding upwardly in a step by step manner until empty.

It is to be noted that upon periodical inspection of the machine for collection of the coins or refilling with policies, the agent will be able to determine which policy receivers attempted to secure the same by the insertion of a slug the size of a quarter, as the slug will rest in a compartment corresponding with a certain policy. This policy may be then cancelled or other appropriate action taken without the company incurring any liability.

While I have specifically mentioned the vending of insurance policies, yet obviously many other articles may be distributed by the mechanism described. By varying the amount of separation of the shelves, bulky articles such as books, handkerchiefs or other such articles may be received thereon, and handled by the machine as shown or as modified for that particular article.

Obviously minor changes may be made in the mechanism shown and described without departing from the spirit of my invention and therefore I wish to have the invention construed broadly and limited only by the scope of the claims.

I claim:

1. A vending machine including a casing, a magazine therein, said magazine having vendible article and coin compartments, and means to move the magazine in a step by step manner past a delivery opening in the casing and to eject an article therefrom, said means being operable upon deposit of a coin in its compartment, said means comprising a vertically movable rod engageable with the bottom of a coin and means to move said rod.

2. A vending machine including a magazine having a series of individual vendible article shelves and a series of individual coin shelves, means operable upon insertion of a coin onto its shelf to eject the upper vendible article from the magazine and through the casing, each coin being deposited at the bottom of a stack thereof, and means for moving the magazine and ejection mechanism relative to each other in a step-by-step manner.

3. A vending machine including a magazine having a series of individual vendible article shelves and a separate series of individual coin shelves, means operable upon insertion of a coin onto its shelf to eject a vendible article from the magazine and through a delivery opening in the casing, means for successively bringing a vendible article shelf into alignment with said delivery opening and simultaneously moving an empty coin shelf into alignment with the coin slot in the casing.

4. A vending machine comprising a casing, a vendible article and coin receiving magazine therein, means to move the magazine in a step by step manner past an article delivery opening in the casing, said means being operable upon deposit of a coin in the magazine, said means comprising a rod vertically movable through a cutaway portion of the coin receiving section of the magazine, and engageable with a coin, and means to move the rod, means to eject an article through the delivery opening.

5. The device of claim 4 in which the rod upon engagement with a coin lifts the magazine to bring a vendible article in line with the delivery opening.

6. A vending machine comprising a casing, a vendible article and coin receiving magazine therein, means to move the magazine in a step by step manner past an article delivery opening in the casing mechanism to eject an article through said opening, said means being operable upon deposit of a coin in the magazine, said means comprising a rod vertically movable through a cutaway portion of the coin receiving section of the magazine, and engageable with a coin, means to move the rod, said means being operable at the first part of its movement to lift the magazine through the instrumentality of the rod and coin, until an article is opposite the delivery opening, and being operable at the last part of its movement to eject an article through the opening.

7. A vending machine comprising a casing, a vendible article and coin receiving magazine therein, means to move the magazine in a step by step manner past a delivery opening in the casing mechanism to eject an article through said opening, said means being operable upon deposit of a coin in the magazine, said means comprising a rod engageable with a coin, and means operable at the first part of its movement to lift the magazine through the instrumentality of the rod and coin, until an article is opposite the delivery opening, and operable at the last part of its movement to eject an article through the opening.

In testimony whereof, I have hereunto subscribed my name this 9th day of December, 1930.

DONALD L. SWEARINGEN.